US012623480B2

(12) United States Patent
Raksha et al.

(10) Patent No.: US 12,623,480 B2
(45) Date of Patent: May 12, 2026

(54) OPTICAL SECURITY ELEMENT

(71) Applicant: VIAVI Solutions Inc., Chandler, AZ (US)

(72) Inventors: Vladimir P. Raksha, Santa Rosa, CA (US); Kees-Jan Delst, Fairfax, CA (US); Paul T. Kohlmann, Windsor, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/605,644

(22) Filed: Mar. 14, 2024

(65) Prior Publication Data

US 2025/0289261 A1 Sep. 18, 2025

(51) Int. Cl.
*B42D 25/328* (2014.01)
*B41M 3/14* (2006.01)
*B42D 25/324* (2014.01)
*B42D 25/369* (2014.01)

(52) U.S. Cl.
CPC ............. *B42D 25/328* (2014.10); *B41M 3/14* (2013.01); *B42D 25/324* (2014.10); *B42D 25/369* (2014.10)

(58) Field of Classification Search
CPC .. B42D 25/328; B42D 25/324; B42D 25/369; B41M 3/14
USPC ..... 283/67, 72, 82, 87, 91, 94, 98, 109, 901
See application file for complete search history.

(56) References Cited

U.S. PATENT DOCUMENTS 5,569,535 A 10/1996 Phillips et al.
5,630,877 A 5/1997 Kashiwagi et al.
6,692,830 B2 2/2004 Argoitia et al.
7,047,883 B2 5/2006 Raksha et al.
7,300,695 B2 11/2007 Argoitia et al.
7,604,855 B2 10/2009 Raksha et al.
7,625,632 B2 12/2009 Argoitia
7,955,695 B2 6/2011 Argoitia
(Continued)

FOREIGN PATENT DOCUMENTS

DE 102010047250 A1 10/2010
EP 1 860 160 A2 11/2007
(Continued)

OTHER PUBLICATIONS

Extended European Search Report on EP Application Ser. No. 25162309.6 dated Aug. 12, 2025 (8 Pages).

*Primary Examiner* — Justin V Lewis
(74) *Attorney, Agent, or Firm* — FOLEY & LARDNER LLP

(57) ABSTRACT

An optical security element may be printed on a substrate. The optical security element may include a plurality of bifunctional pigment flakes provided in a binder. A bifunctional pigment flake in the plurality of bifunctional pigment flakes may comprise a first surface having a diffraction grating relief with a first modulation, and a second surface having a second modulation that is smaller than the first modulation. The plurality of bifunctional pigment flakes are arranged such that, in a presence of incident light, diffraction colors are exhibited by a first subset of the plurality of bifunctional pigment flakes that are in a first region of the optical security element, and an interference color is exhibited by a second subset of the plurality of bifunctional pigment flakes that are in a second region of the optical security element.

20 Claims, 17 Drawing Sheets

(56) References Cited

U.S. PATENT DOCUMENTS

| | | | |
|---|---|---|---|
| 8,025,952 B2 | 9/2011 | Raksha et al. | |
| 8,343,615 B2 | 1/2013 | Raksha et al. | |
| 9,176,266 B2 | 11/2015 | Fuhse et al. | |
| 9,257,059 B2 | 2/2016 | Raksha et al. | |
| 10,081,213 B2 | 9/2018 | Fuhse | |
| 10,173,455 B2 | 1/2019 | Raksha et al. | |
| 10,226,790 B2 | 3/2019 | Raksha et al. | |
| 10,357,991 B2 | 7/2019 | Raksha et al. | |
| 10,981,410 B2 | 4/2021 | Delst et al. | |
| 11,186,110 B2 | 11/2021 | Raksha et al. | |
| 2014/0210200 A1 | 7/2014 | Bornschlegl et al. | |
| 2019/0275826 A1 | 9/2019 | Raksha et al. | |
| 2022/0091313 A1* | 3/2022 | Argoitia | C09C 1/0024 |

FOREIGN PATENT DOCUMENTS

| | | |
|---|---|---|
| EP | 2694299 B1 | 3/2012 |
| EP | 3291997 A1 | 5/2016 |

* cited by examiner

PRIOR ART

PRIOR ART

PRIOR ART

| Layer | | Thickness (nm) |
|---|---|---|
| 750 | | 40 |
| 706a1 | 704a | 6 |
| 708a1 | | 288 |
| 706a2 | | 10 |
| 708a2 | | 288 |
| 710a | | 80 |
| 714 | | 100 |
| 710b | 704b | 80 |
| 708b1 | | 288 |
| 706b1 | | 10 |
| 708b2 | | 288 |
| 706b2 | | 6 |

FIG. 8B

| Layer | | Thickness (nm) |
|---|---|---|
| 750 | | 100 |
| 706a1 | 704a | 3 |
| 708a1 | | 220 |
| 706a2 | | 10 |
| 708a2 | | 220 |
| 710a | | 80 |
| 714 | | 100 |
| 712 | | 800 |
| 710b | 704b | 80 |
| 708b1 | | 220 |
| 706b1 | | 10 |
| 708b2 | | 220 |
| 706b2 | | 3 |

FIG. 9

OPTICAL SECURITY ELEMENT

BACKGROUND

An article, such as a banknote, may include a printed optical security element (e.g., an anti-counterfeiting feature) that uses a color-shifting interference pigment comprising a plurality of magnetizable pigment flakes. The magnetizable pigment flakes are dispersed in a thin layer of ink printed on the article and color-shifting is provided based on reflection of incident light from the pigment flakes. Generally, the magnetizable pigment flakes are aligned in a particular manner by applying a magnetic field to the ink prior to drying. As one example, a curved magnetic field can be used to align the magnetizable pigment flakes such that the pigment flakes are tilted at different angles relative to a substrate of the article, so as to cause the pigment flakes to reflect incident light in different directions (depending on the angle of orientation of a given pigment flake). Here, the direction of reflection for a given pigment flake is governed by the tilt angle and the law of reflection. The law of reflection states that when a light ray is incident on a smooth surface, an angle of reflection of the light ray is equal to an angle of incidence of the light ray.

SUMMARY

In some implementations, an optical security element printed on a substrate includes a plurality of bifunctional pigment flakes provided in a binder, wherein a bifunctional pigment flake in the plurality of bifunctional pigment flakes comprises a first surface having a diffraction grating relief with a first modulation, and a second surface having a second modulation that is smaller than the first modulation, wherein the plurality of bifunctional pigment flakes are arranged such that, in a presence of incident light: diffraction colors are exhibited by a first subset of the plurality of bifunctional pigment flakes that are in a first region of the optical security element, and an interference color is exhibited by a second subset of the plurality of bifunctional pigment flakes that are in a second region of the optical security element.

In some implementations, a method for printing an optical security element on a substrate includes providing, on the substrate, a binder that includes a plurality of magnetizable bifunctional pigment flakes, wherein a magnetizable bifunctional pigment flake in the plurality of magnetizable bifunctional pigment flakes comprises a first surface having a diffraction grating relief with a first modulation and a second surface with a second modulation that is smaller than the first modulation; applying a magnetic field to the binder using one or more magnets, wherein the magnetic field orients the plurality of magnetizable bifunctional pigment flakes according to the magnetic field, wherein the plurality of magnetizable bifunctional pigment flakes are oriented such that, in a presence of incident light: diffraction colors are exhibited in a first region of the optical security element by a first subset of the plurality of magnetizable bifunctional pigment flakes, and an interference color is exhibited in a second region of the optical security element by a second subset of the plurality of magnetizable bifunctional pigment flakes; and setting or hardening the binder.

In some implementations, a printed optical security element includes a first region comprising a first subset of a plurality of bifunctional pigment flakes disposed in a binder, wherein the first subset of the plurality of bifunctional pigment flakes are arranged such that, in a presence of incident light, diffraction colors are exhibited in the first region of the optical security element, and a second region comprising a second subset of the plurality of bifunctional pigment flakes disposed in the binder, wherein the second subset of the plurality of bifunctional pigment flakes are arranged such that, in the presence of the incident light, an interference color is exhibited in the second region of the optical security element, wherein the first region is distinct from the second region such that the diffraction colors and the interference color are non-blended.

BRIEF DESCRIPTION OF THE DRAWINGS

FIGS. 8A-8C are diagrams associated with another example implementation of a bifunctional pigment flake comprising a multilayer optical structure including a first optical stack and a second optical stack.

FIG. 9 is a diagram associated with another example implementation of a bifunctional pigment flake comprising a multilayer optical structure including a first optical stack and a second optical stack.

DETAILED DESCRIPTION

The following detailed description of example implementations refers to the accompanying drawings. The same reference numbers in different drawings may identify the same or similar elements.

Optical effects of conventional optical security elements have a feature in common—they are produced by a color—shifting pigment comprising magnetizable pigment flakes that are dispersed in a layer of ink that is printed on an article. The color of the color-shifting pigment changes as an observation angle changes. For example, in a conventional one hundred dollar ($100) U.S. banknote, the numeral "100" is printed so that the color of the optical security element (e.g., the numeral "100") changes from a green color to a blue color as the banknote is tilted in one direction with respect to an observer (e.g., a human eye). Tilting the banknote in the opposite direction restores the original green color from the perspective of the observer.

Optical security elements printed with a pigment comprising a plurality of magnetizable pigment flakes that are aligned to different angles by application of a magnetic field exhibit a different appearance. For example, in a conventional 50 euro banknote (€50), the numeral "50" is printed with magnetizable green-to-blue pigment and is exposed to a magnetic field to produce a rolling bar effect. The rolling bar effect provides a bright (green) band of reflected light on a dark background near a middle of the optical security element (e.g., the numeral 50) at a normal observation angle. Here, the bright band of reflected light moves toward a bottom of the optical security element when an upper edge of the banknote is tilted away from the observer from normal, and moves toward a top of the optical security element when the upper edge of the banknote is tilted toward the observer from normal.

Figure 1A:
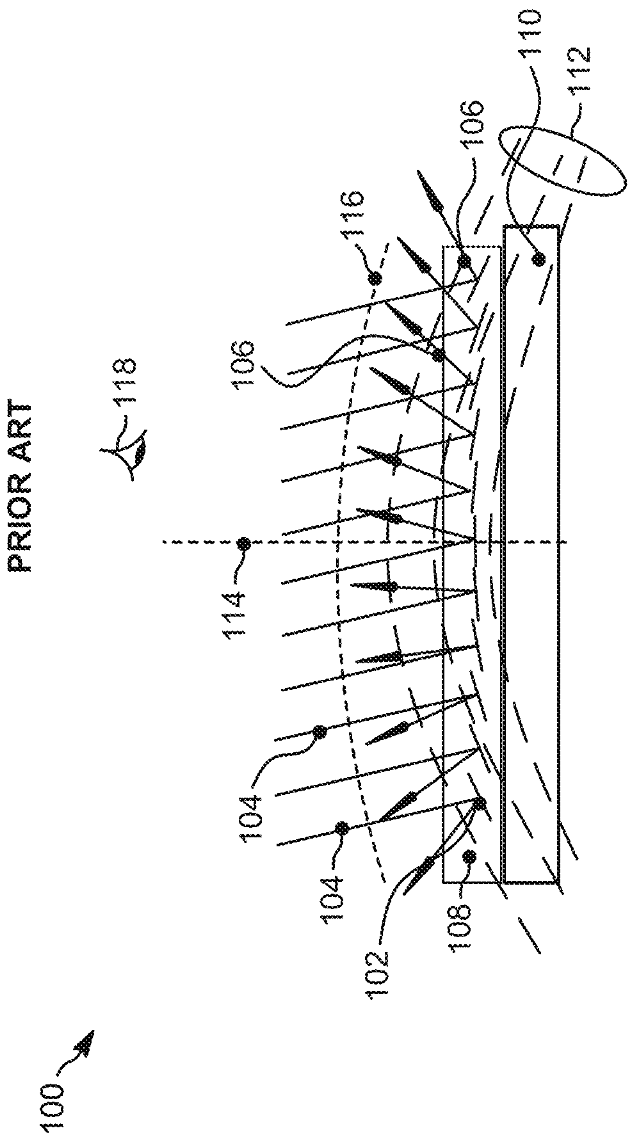
FIGS. 1A-1B are examples associated with a conventional optical security element comprising a plurality of magnetizable pigment flakes that are aligned to different angles.
Figure 1B:
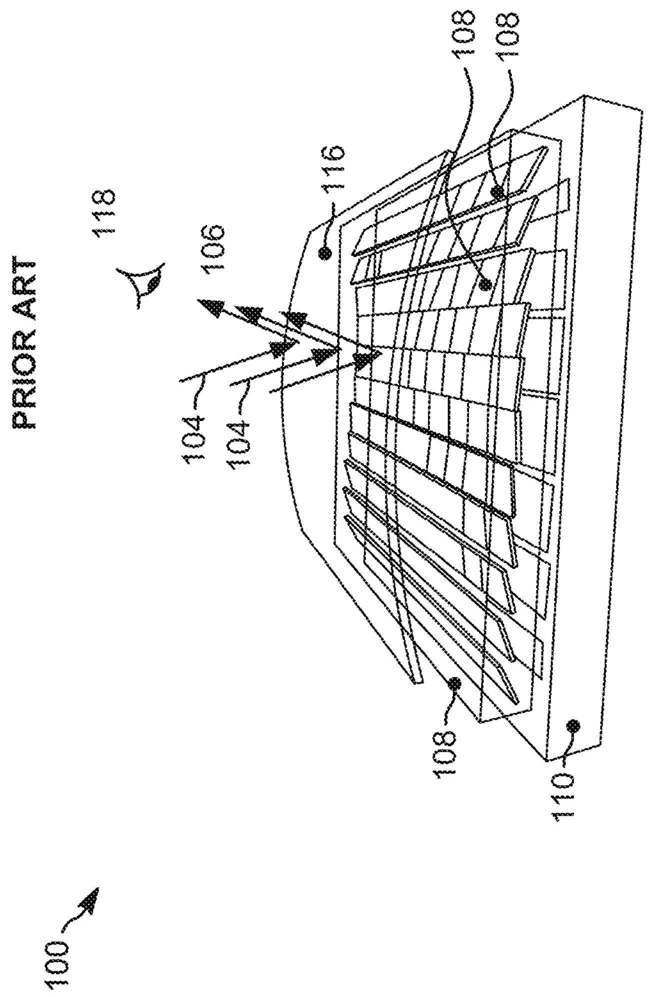

FIGS. 1A-1B are examples associated with a conventional optical security element 100 comprising a plurality of magnetizable pigment flakes 102 that are aligned to different angles. FIG. 1A is an example of a ray diagram illustrating directions of rays of incident light 104 and directions of rays of reflected light 106 in the conventional optical security element 100. In this example, a thin layer of ink 108 includes the reflective magnetizable pigment flakes 102 and is printed on a paper substrate 110. A magnetic field 112 was applied to the paper substrate 110 such that the pigment flakes 102 are tilted around their respective centers at gradual angles to the paper substrate 110 around a center of alignment 114 along lines of the magnetic field 112, as shown in FIG. 1A. Here, parallel rays of incident light 104 from a distant source are incident on the pigment flakes 102 and are reflected in different directions, with a direction of reflection provided by a given pigment flake 102 being defined by geometrical optics of plane mirrors for an angle between the given pigment flake 102 and the ray of incident light 104 on the given pigment flake 102. Pigment flakes 102 that are tilted at high angles relative to the substrate (not shown in FIG. 1A) reflect incident light toward the paper substrate 110, where the light gets dispersed or absorbed by the paper substrate 110. Pigment flakes 102 that are tilted at low angles relative to the paper substrate 110 provide the rays of reflected light 106, which forms a curved reflected wavefront 116 from the perspective of an observer 118.

FIG. 1B is an orthogonal representation of the reflected wavefront 116 for the cross-sectional arrangement of pigment flakes 102 in the conventional optical security element 100. As demonstrated in FIG. 1B, incident light 104 is reflected from the pigment flakes 102 (illustrated as an array of micro-mirrors) in a curved manner in predetermined directions by a surface of the ink 108. A radius of curvature depends on the tilting angles of pigment flakes 102 and a width of the pigment flakes 102 from a center of the alignment. The wavefront 116 in FIG. 1B is a convex cylindrical wavefront. However, the observer 118 sees only those parts of the wavefront that reflect light directly to the point of observation and, therefore, perceives this reflection as a reflection from a narrow band inside the ink 108.

In some cases, pigment flakes can be oriented by a magnetic field so as to provide convex or concave incident light reflection that produces an optical effect with virtual movement of a reflected region that results in an illusive depth appearance. For example, pigment flakes can be aligned by a rotating magnetic field so as to provide a dome-like hemispheric optical effect. In one example, the pigment flakes are oriented so as to provide a printed Fresnel-like convex reflector. Here, as an article on which the pigment is printed is tilted back and forth, points of reflected light move, which creates an impression of a spherical surface.

Figure 2:
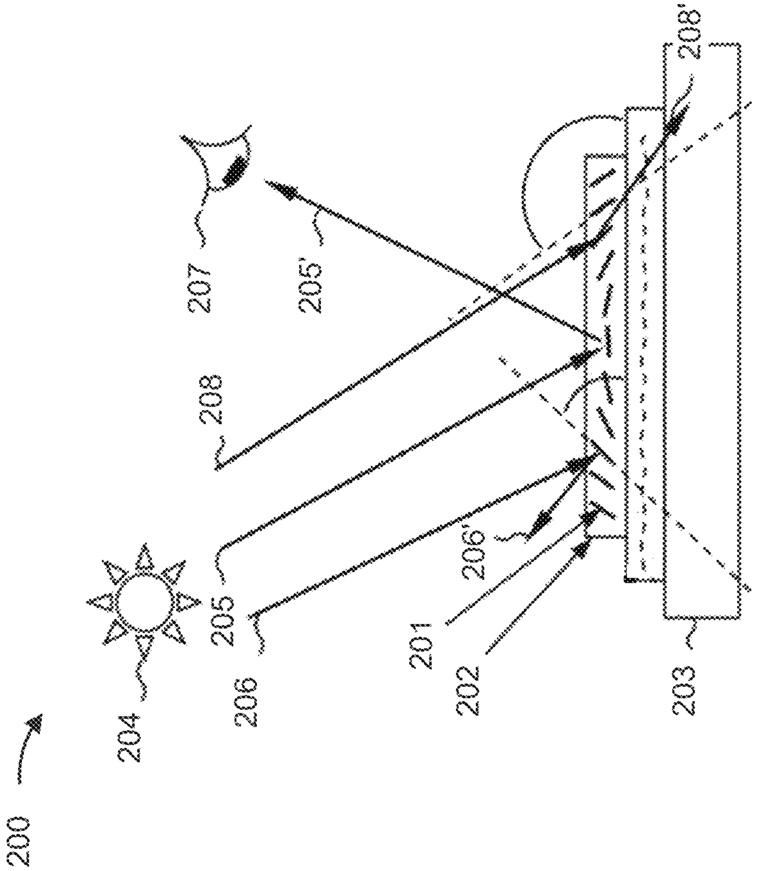
FIG. 2 is an example of magnetizable pigment flakes oriented in a cylindrical structure.

Colors of an optical security element printed with a color-shifting interference pigment comprising a plurality of magnetizable pigment flakes aligned by an external magnetic field depend on directions of incident light reflected by the pigment flakes having the different angular orientations relative to the substrate. FIG. 2 is an example of magnetizable pigment flakes oriented in a cylindrical structure. In FIG. 2, an article 200 is exposed to a light source 204 and a light ray 205 reflects off a pigment flake 201, resulting in light ray 205' being directed toward an observer 207. In contrast, light rays 206 and 208, which are substantially parallel to the light ray 205, are reflected such that light rays 206' and 208' are directed away from the observer 207 as a result of the alignment of the pigment flakes 201 in the direction of the magnetic field (rather than parallel to a substrate 203 of the article 200). In this case and at this orientation of the article 200 relative to the light source 204 and the observer 207, an element formed by the pigment flakes 201 in the organic binder 202 appears as a bright reflective band in a region corresponding to light ray 205/205' and as a dark non-reflective area (e.g., black) in regions corresponding to light rays 206/206' and 208/208'.

Figure 3:
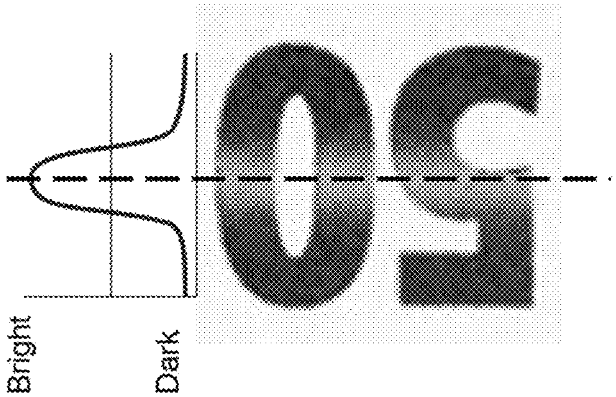
FIG. 3 is a diagram illustrating a color distribution along a width of a conventional optical security element.

FIG. 3 is a diagram illustrating a bright/dark color distribution along a width of an optical security element in a conventional 50 euro banknote. If all pigment flakes in the color of the green-to-blue pigment of the optical security element were aligned in parallel with a substrate of the article, then the color of the entire optical security element would be bright green at a normal observation angle, and would be bright blue at other observation angles. However, if the pigment flakes are angled with respect to the substrate (e.g., in the manner illustrated in FIG. 2) based on being aligned by a magnetic field, then the optical security element does not exhibit the bright blue color. Instead, some regions of the optical security element appear dark blue or almost black. In this example, a region becomes black when an angular orientation of pigment flakes in the region exceeds 60 degrees with respect to the substrate, and a concentration of the pigment flakes in the region is greater than 15% weight (wt. %). In general, a dark appearance after a steep alignment of pigment flakes changes the color of a conventional optical security element printed on an article. For example, a gold-to-green pigment becomes gold-to-dark after magnetic orientation, a red-to-gold pigment becomes red-to-dark, a magenta-to-gold pigment becomes magenta-to-dark, and so on. As a result, the color-shifting printed security elements became single-color elements.

An optical security element that exhibits more than one color at the same time is desirable (e.g., to improve security). An optical security element printed with an interference pigment comprising a diffractive texture produces multiple rainbow-like colors. However, reflectance of incident light of such a pigment is lower than reflectance of a non-textured pigment due to the scattering of reflected light by a grated surface of the diffractive texture. As a result, the number of printed optical effects that can produced by diffractive security pigments is limited.

Figure 4:
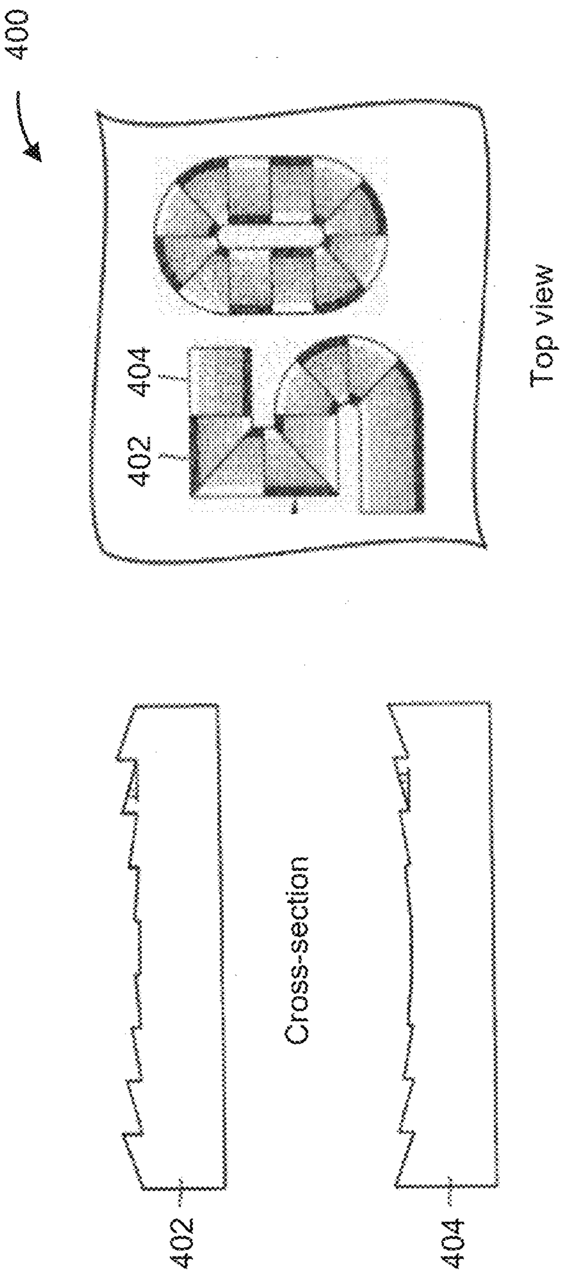
FIG. 4 is a diagram illustrating an optically active element formed by reflection elements that are molded into an embossing lacquer and coated with a reflection-enhancing coating.

Other techniques for producing of volumetric-like optical effects are available. One such technique provides an optical security element that has a reflective area divided into a plurality of reflective pixels embossed in a polymeric layer, which produces a relief structure in such a way that light incident on a given area is reflected along a predetermined direction. Here, the pixels are embossed in the form of a convex reflector to produce a rolling bar effect. Another technique provides an optically active element formed by reflection elements that are molded into an embossing lacquer and coated with a reflection-enhancing coating. FIG. 4 illustrates examples of an optically active element 400 formed by reflection elements 402 and 404. Here, the plurality of molded reflection elements 402/404 enable the optically active element 400 to exhibit diffraction colors and interference colors at the same observation angle. Optical security elements provided according to these techniques (i.e., reflective pixels embossed in a polymeric layer, molded reflection elements) are fabricated in four steps: (1) embossing, (2) coating with an interference color-shifting thin film structure, (3) cutting, and (4) lamination. More particularly, the pixels (or molded reflection elements) are embossed on a roll or a sheet of a corresponding polymeric substrate in a first step and are coated with an interference color-shifting coating in a second step. The substrate is cut into ribbons (for security threads) or individual pieces (for security patches) in a third step. In a fourth step, the ribbons are embedded into paper during the process of security paper fabrication (for security threads), or pieces are adhered to paper by hot stamping (for security patches). This multi-step process for fabricating such optical security elements is undesirably complex and has a higher cost (e.g., as compared to cost and complexity of fabricating a printed optical security element).

Some implementations described herein provide an optical security element that concurrently exhibits an interference color and diffraction colors at the same observation angle, and that can be printed on a substrate in a single step. In some implementations, the optical security element is printed on a substrate and comprises a binder (e.g., an organic binder) and a plurality of bifunctional pigment flakes provided in the binder. Here, a given bifunctional pigment flake comprises a first surface having a diffraction grating relief with a first modulation, and a second surface having a second modulation that is smaller than the first modulation. The bifunctional pigment flakes are arranged such that, in a presence of incident light, diffraction colors are exhibited by a first subset of the plurality of bifunctional pigment flakes that are in a first region of the optical security element, and an interference color is exhibited by a second subset of the plurality of bifunctional pigment flakes that are in a second region of the optical security element. In some implementations, the second modulation is at least 50% smaller than the first modulation. In some implementations, a given bifunctional pigment flake exhibits diffraction of incident light at a tilt angle, relative to the substrate, that is larger than approximately 45 degrees (45°), and exhibits an interference color at a tilt angle that is less than approximately 45°.

Figure 5:
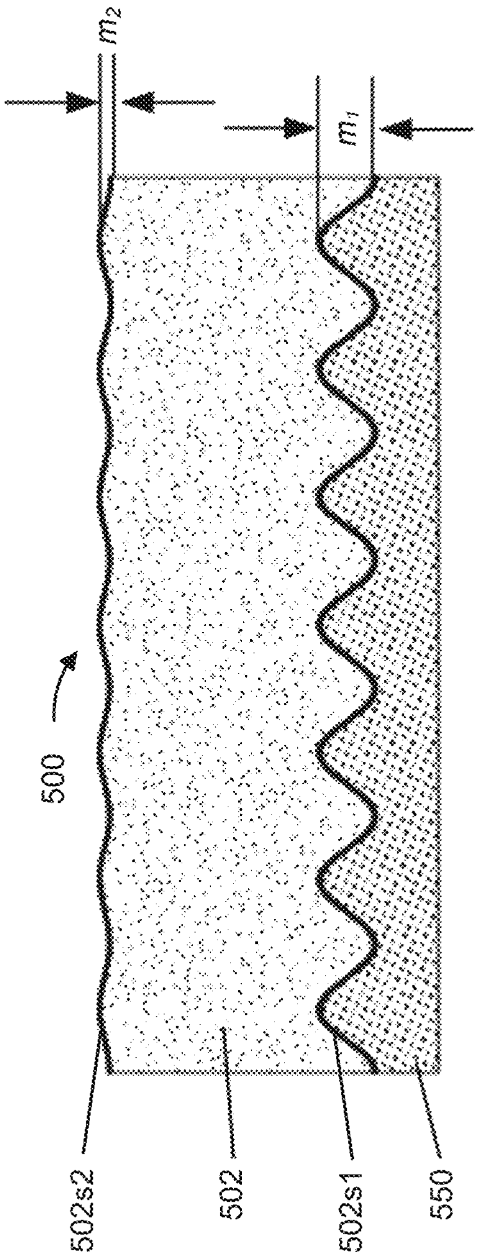
FIG. 5 is a diagram illustrating an example of a bifunctional pigment flake as described herein.

FIG. 5 is a diagram illustrating an example of a bifunctional pigment flake 500 on a substrate 550. In some implementations, as shown in FIG. 5, the bifunctional pigment flake 500 comprises a multilayer optical structure 502 that has a first surface **502*s*1 and a second surface 502*s*2. FIG. 5 is provided for illustrative purposes, and individual layers of the multilayer optical structure 502 are not shown in FIG. 5**.

The multilayer optical structure 502 is a multilayer structure that includes a plurality of optical stacks that cause the bifunctional pigment flake 500 to exhibit diffraction colors for a first range of angles and exhibit an interference color for a second range of angles. In some implementations, the first range of angles may include angles that are greater than approximately 45°, and the second range of angles may include angles that are less than approximately 45°. In general, the first range of angles may include angles that are greater than an angle $\alpha$, and the second range of angles may include angles that are less than the angle $\alpha$. Additional details regarding the multilayer optical structure 502 are provided below with respect to FIGS. 7A-7B and 8A-8C. In some implementations, a thickness of the multilayer optical structure 502 may be in a range from approximately 400 nanometers (nm) to approximately 3 micrometers (μm).

In some implementations, as shown in FIG. 5, the multilayer optical structure 502 of the bifunctional pigment flake 500 is formed over a surface of the substrate 550 that comprises a diffraction grating structure (e.g., a periodic structure comprising a series of ridges and valleys). In some implementations, as shown in FIG. 5, the first surface **502*s*1 has a modulation that corresponds to a relief of the diffraction grating structure of the substrate 550. That is, the first surface 502*s*1 may have a modulation that mirrors that of the diffraction grating structure of the substrate 550**. As used herein, the term "modulation" refers to a distance between a given high point (e.g., a ridge) and a given low point (e.g., a valley) on a surface. Put another way, a modulation may refer to a depth of a profile of a surface.

As shown in FIG. 5, the first surface **502*s*1 of the multilayer optical structure 502 (and the surface of the substrate 550) has a modulation $m_1$, and the second surface 502*s*2 has a modulation identified as $m_2$. As shown, the modulation $m_2$ is smaller than the modulation $m_1$ That is, the second surface 502*s*2 is comparatively flatter than the first surface 502*s*1. In some implementations, the modulation $m_2$ is at least approximately 50% smaller than the modulation $m_1$. That is, the modulation $m_2$ is in some implementations less than half the modulation $m_1$. In some implementations, the difference in modulation between the first surface 502*s*1 and the second surface 502*s*2 enables the bifunctional pigment flake 500 to exhibit diffraction colors for a first range of angles of the multilayer optical structure 502 with respect to an angle of incident light, and to exhibit an interference color for a second range of angles of the multilayer optical structure 502** with respect to the angle of the incident light, as described below.

In some implementations, a thickness of the multilayer optical structure 502 (e.g., a thickness of one or more layers of the multilayer optical structure 502) causes the modulation $m_2$ of the second surface **502*s*2 to be smaller than the modulation $m_1$ of the first surface 502*s*1. Thus, in some implementations, the thickness of the multilayer optical structure 502 (e.g., the thickness of one or more layers of the multilayer optical structure 502) can be controlled or selected so as to achieve a desired modulation reduction of the second surface 502*s*2 (relative to the modulation of the first surface 502*s*1**).

As indicated above, FIG. 5 is provided as an example. Other examples may differ from what is described with regard to FIG. 5. The number and arrangement of layers shown in FIG. 5 are provided as an example. In practice, there may be additional layers, fewer layers, different layers, or differently arranged layers than those shown in FIG. 5. Furthermore, two or more layers shown in FIG. 5 may be implemented within a single layer, or a single layer shown in FIG. 5 may be implemented as multiple, distributed layers. Additionally, or alternatively, a set of layers (e.g., one or more layers) shown in FIG. 5 may perform one or more functions described as being performed by another set of layers shown in FIG. 5.

Figure 6:
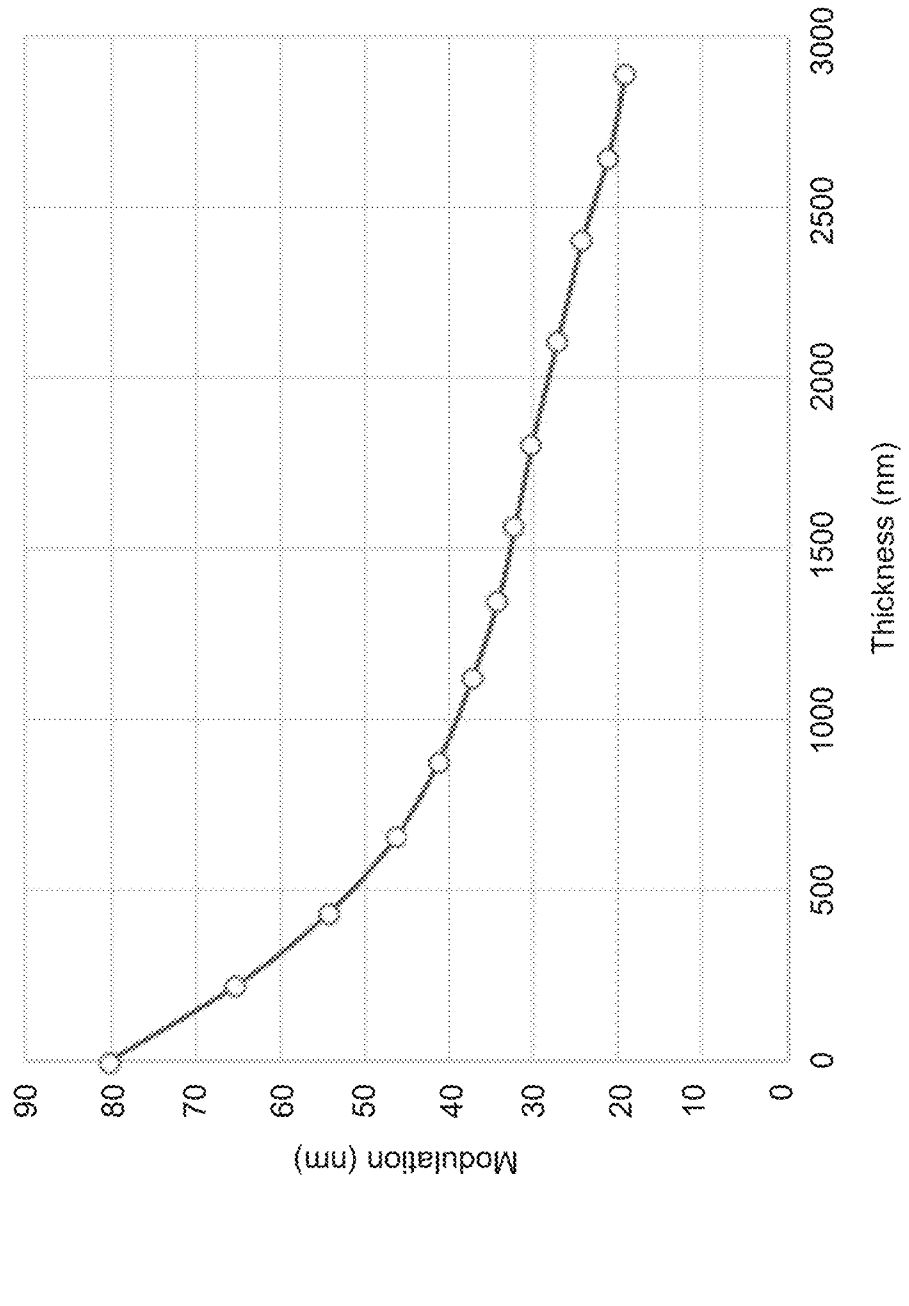
FIG. 6 is a diagram illustrating a particular example of modulation reduction of a surface of a multilayer optical structure of a bifunctional pigment flake.

FIG. 6 is a diagram illustrating a particular example of modulation reduction of the second surface **502*s*2 (with respect to the first surface 502*s*1) that can be achieved by increasing a thickness of the multilayer optical structure 502. In the example of FIG. 6, a multilayer optical structure 502 comprising layers of thin film magnesium fluoride ($MgF_2$) (with different thicknesses) are deposited on a polyester crossed grating substrate 550 that has a surface with a modulation of 80 nm. As shown in FIG. 6, the modulation of the second surface 502*s*2 decreases from 80 nm to 19 nm as a thickness of the multilayer optical structure 502 approaches 2900 nm. In some implementations, modulation reduction of the second surface 502*s*2 (e.g., as compared to the modulation of the first surface 502*s*1) may depend on one or more characteristics of the multilayer optical structure 502, such as a thickness of one or more layers of the multilayer optical structure 502, a porosity of one or more layers of the multilayer optical structure 502, a crystallinity of one or more layers of the multilayer optical structure 502, or a presence (or absence) of a columnar structure within one or more layers of the multilayer optical structure 502**, among other examples.

As indicated above, FIG. 6 is provided as an example. Other examples may differ from what is described with regard to FIG. 6.

Figure 7A:
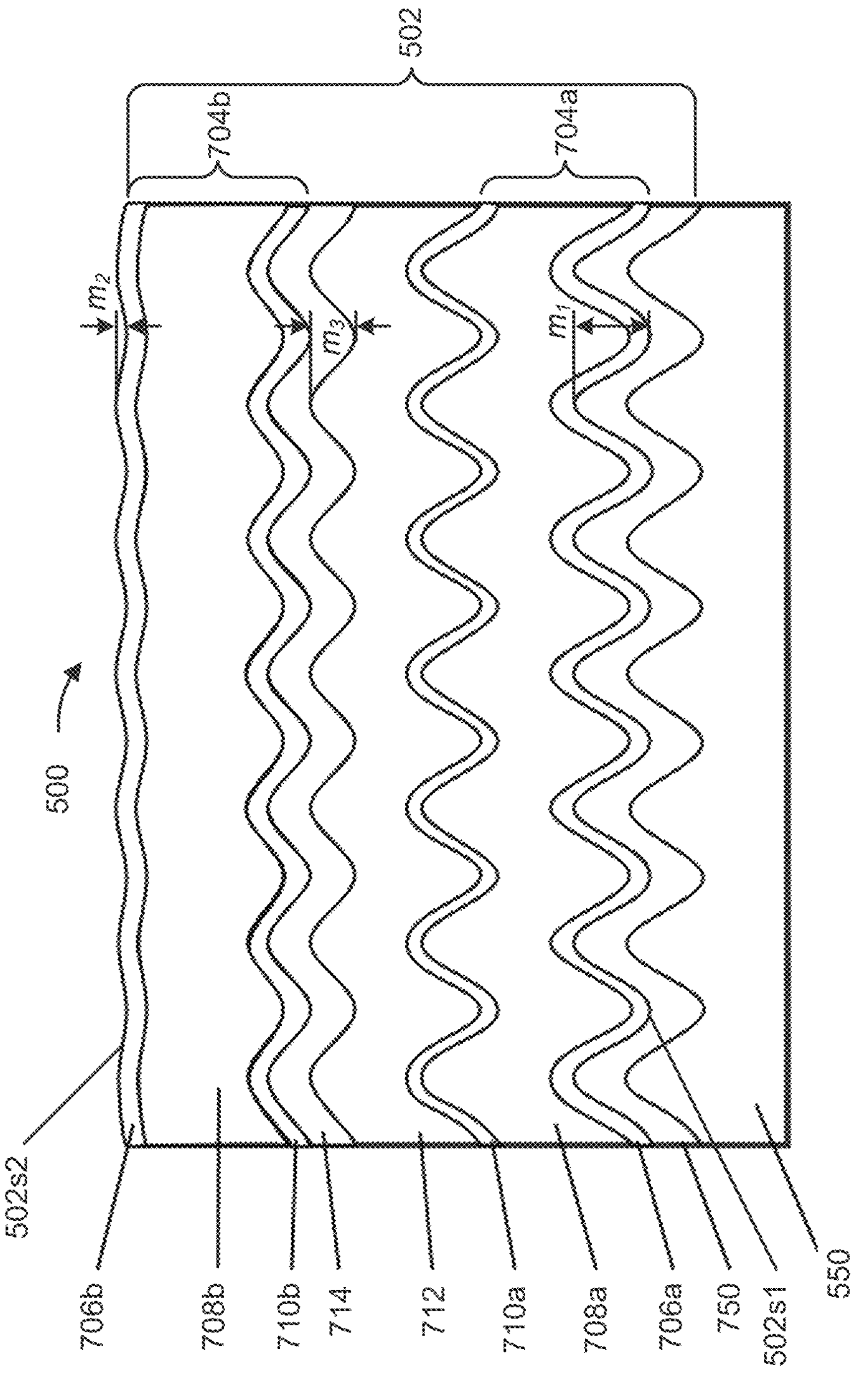
FIGS. 7A-7B are diagrams associated with an example implementation of a bifunctional pigment flake comprising a multilayer optical structure including a first optical stack and a second optical stack.
Figure 7B:
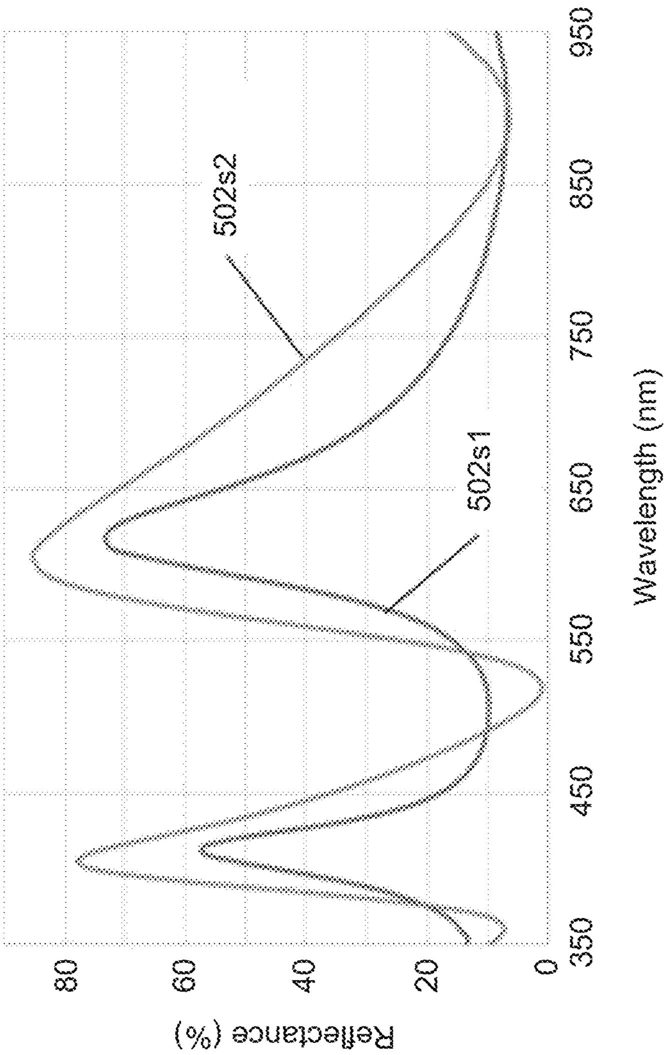

In some implementations, the multilayer optical structure 502 includes a pair of optical stacks. FIGS. 7A-7B are diagrams associated with an example implementation of a bifunctional pigment flake 500 comprising a multilayer optical structure 502 including a first optical stack **704*a* and a second optical stack 704*b*. In the example shown in FIG. 7A, the first optical stack 704*a* includes an absorber layer 706*a* (e.g., a first semi-transparent Cr layer), a transparent layer 708*a* (e.g., a first dielectric $MgF_2$ layer), and a reflector layer 710*a* (e.g., a first opaque Al layer). Similarly, the second optical stack 704*b* includes a reflector layer 710*b* (e.g., a second opaque Al layer), a transparent layer 708*b* (e.g., a second dielectric MgF2 layer), and an absorber layer 706*b* (e.g., a second semi-transparent Cr layer). As further shown, the multilayer optical structure 502 further includes an intermediate layer 712 (e.g., a third MgF2 layer) and a magnetizable layer 714 between the first optical stack 704*a* and the second optical stack 704*b***.

In some implementations, as shown in FIG. 7A, the multilayer optical structure 502 is formed on a release layer 750 on a surface of the substrate 550. In some implementations, the release layer 750 is a removable layer (e.g., a layer that dissolves in the presence of a solvent) that enables separation of the bifunctional pigment flake 500 from the substrate 550.

In the example shown in FIG. 7A, the first optical stack **704*a* and the second optical stack 704*b* are one-cavity optical stacks (i.e., the first optical stack 704*a* comprises a single cavity and the second optical stack 704*b* comprises a single cavity). Further, the first optical stack 704*a* is symmetrical to the second optical stack 704*b* (e.g., with the intermediate layer 712 and the magnetizable layer 714 acting as a plane of symmetry). In some implementations, the first optical stack 704*a* and/or the second surface 502*s*2 may be a multi-cavity optical stack (e.g., the first optical stack 704*a* and/or the second optical stack 704*b* may be a two-cavity optical stack, an example of which is described below with respect to FIGS. 8A-8C). Additionally, or alternatively, the first optical stack 704*a* and the second optical stack 704*b* may in some implementations be asymmetric (e.g., such that a layer structure of the first optical stack 704*a* is different from a layer structure of the second optical stack 704*b* with respect to a central plane formed by the intermediate layer 712 and the magnetizable layer 714**).

In some implementations, as shown in FIG. 7A and described herein, the modulation $m_1$ of the first surface **502*s*1 of the multilayer optical structure 502 is greater than the modulation $m_2$ of the second surface 502*s*2 of the multilayer optical structure 502. Further, as illustrated in FIG. 7A, a surface of a layer of the multilayer optical structure 502 that is between the first surface 502*s*1 and the second surface 502*s*2 has a modulation that is smaller than the modulation $m_1$ of the first surface 502*s*1 and that is larger than the modulation $m_2$ of the second surface 502*s*2. For example, as illustrated in FIG. 7A, a modulation $m_3$ of a surface of the intermediate layer 712 is larger than the modulation $m_2$ of the second surface 502*s*2 and is smaller than the modulation $m_1$ of the first surface 502*s*1. In some implementations, modulations of surfaces within the multilayer optical structure 502 decrease along a direction moving from the first surface 502*s*1 to the second surface 502*s*2 (e.g., the modulation of surfaces decreases in a direction moving away from the relief of the diffraction grating that is the first surface 502*s*1**).

In the example shown in FIG. 7A, a thickness of the bifunctional pigment flake 500 is controlled by a thickness of the intermediate layer 712. Thus, in some implementations, the incorporation of the intermediate layer 712 (e.g., between the first optical stack **704*a* and the second optical stack 704*b*) can be used to provide a thickness that causes the second surface 502*s*2 to be flatter than the first surface 502*s*1. In some implementations, the intermediate layer 712 is a layer of an indifferent material (e.g., a dielectric material, such as $MgF_2$). In some implementations, as shown in FIG. 7A, the intermediate layer 712 is between the first optical stack 704*a* and the second optical stack 704*b* (e.g., near a middle of a single-cavity bifunctional pigment flake 500**).

In some implementations, the bifunctional pigment flake 500 shown in FIG. 7A can be formed using vacuum deposition of layers over the substrate 550. For example, the surface of the substrate 550 comprising the diffraction grating structure can be coated with layers of different materials by thermal evaporation in a vacuum. In this example, the substrate 550 is coated with the release layer 750. Next, the absorber layer **706*a* is deposited on the release layer 750. The transparent layer 708*a* is deposited on the absorber layer 706*a*, after which the reflector layer 710*a* is deposited on the transparent layer 708*a*. Here, the transparent layer 708*a* (e.g., the layer between the absorber layer 706*a* and the reflector layer 710*a*) defines the color of the goniochromatic interference thin film structure of the first optical stack 704*a***.

Next, the intermediate layer 712 is deposited on the reflector layer **710*a*. In some implementations, the intermediate layer 712 may comprise a dielectric material, such as $MgF_2$. In some implementations, a thickness of the intermediate layer may be in a range from approximately 100 nm to approximately 2000 nm. Notably, the intermediate layer 712 does not define the color of the bifunctional pigment flake 500. Here, the purpose of the intermediate layer 712 is to increase a physical thickness of the multilayer optical structure 502 so as to control (e.g., decrease) the modulation $m_2$ of the second surface 502*s*2. Put another way, the intermediate layer 712 may serve as a spacer that governs the total thickness of the bifunctional pigment flake 500 in association with reducing the modulation $m_2$ of the second surface 502*s*2 relative to the modulation $m_1$ of the first surface 502*s*1**.

The magnetizable layer 714 (e.g., a layer comprising any suitable magnetizable material) is formed on the intermediate layer 712, and the second optical stack 704*b* is formed on the magnetizable layer 714. In this example, formation of the second optical stack 704*b* includes formation of the reflector layer 710*b*, followed by formation of the transparent layer 708*b*, followed by formation of the absorber layer 706*b*. Here, a top surface of the absorber layer 706*b* is the second surface 502*s*2. In some implementations, a thickness of absorber layer 706*b* may match that of absorber layer 706*a*, a thickness of the transparent layer 708*b* may match a thickness of the transparent layer 708*a*, and/or a thickness of the reflector layer 710*b* may match that of the reflector layer 710*a*. Additionally, or alternatively, a thickness of absorber layer 706*b* may differ from that of absorber layer 706*a*, a thickness of the transparent layer 708*b* may differ from a thickness of the transparent layer 708*a*, and/or a thickness of the reflector layer 710*b* may differ from that of the reflector layer 710*a*. The thicknesses of the transparent layers 708*a* and 708*b* determine the color exhibited by the bifunctional pigment flake 500. In some implementations, a transparent layer 708 (e.g., the transparent layer 708*a*, the transparent layer 708*b*) may comprise a material with a low refractive index (e.g., $MgF_2$, $SiO_2$, or the like). Additionally, or alternatively, a transparent layer 708 may comprise a material with a high refractive index (e.g., ZnS, $TiO_2$, or the like). The multilayer optical structure 502 shown in FIG. 7A can be expressed as follows:

Second optical stack 704*b*
Magnetizable layer 714
Intermediate layer 712
First optical stack 704*a*
where each optical stack 704 comprises a respective absorber layer 706, transparent layer 708, and reflector layer 710.

In a particular example implementation, the multilayer optical structure 502 may be a gold-to-green single-cavity interference pigment thin film symmetric structure that is deposited on a crossed diffraction grating with a frequency of 3500 lines per mm and a modulation of 80 nm. Here, the structure has the following configuration:

Second optical stack 704*b* (510 nm, see below)
Magnetizable layer 714 (80 nm nickel)
Intermediate layer 712 (600 nm $MgF_2$)
First optical stack 704*a* (510 nm, see below)
Release layer 750
Substrate 550 where each optical stack 704 comprises an absorber layer 706 (10 nm Cr), a transparent layer 708 (420 nm MgF2), and a reflector layer 710 (80 nm Al). In this example, a total thickness of the multilayer optical structure 502 is 1700 nm. FIG. 7B is a diagram illustrating spectral characteristics of a first side of the multilayer optical structure 502 (e.g., a side of the multilayer optical structure 502 with the first surface 502*s*1) and a second side of the multilayer optical structure 502 (e.g., a side of the multilayer optical structure 502 with the second surface 502*s*2) at diffuse (e.g., 8°) geometry. Here, the first surface 502*s*1 has a modulation $m_1$ of 80 nm and, due in part to the structure of the multilayer optical structure 502 (e.g., the thickness of the intermediate layer 712), the second surface 502*s*2 has a modulation $m_2$ of 30 nm.

As illustrated in FIG. 7B, the first side of the multilayer optical structure 502 (i.e., the side with the first surface 502*s*1 with the 80 nm modulation) has a generally lower reflectance than a reflectance of the second side of the multilayer optical structure 502 (e.g., the side with the second surface 502*s*2 with the 30 nm modulation) over a range of wavelengths from 350 nm to 950 nm. Further, the chroma (C*) and hue (h*) of the first side are lower than the chroma and the hue of the second side, as illustrated in the table below:

| | C* | h* |
|---|---|---|
| First surface 502s1 side | 49.26 | 17.96 |
| Second surface 502s2 side | 58.6 | 16.06 |

As indicated above, FIGS. 7A-7B are provided as examples. Other examples may differ from what is described with regard to FIGS. 7A-7B. The number and arrangement of layers shown in FIG. 7A are provided as an example. In practice, there may be additional layers, fewer layers, different layers, or differently arranged layers than those shown in FIG. 7A. Furthermore, two or more layers shown in FIG. 7A may be implemented within a single layer, or a single layer shown in FIG. 7A may be implemented as multiple, distributed layers. Additionally, or alternatively, a set of layers (e.g., one or more layers) shown in FIG. 7A may perform one or more functions described as being performed by another set of layers shown in FIG. 7A.

In some implementations, the thickness of the multilayer optical structure 502 and, therefore, the thickness used to control the modulation of the second surface 502*s*2, can be at least partially defined by a design of the multilayer optical structure 502. That is, in some implementations, the bifunctional pigment flake 500 can be designed such that a thickness of the pigment itself causes the second surface 502*s*2 to be flatter than the first surface 502*s*1. In some implementations, a multilayer optical structure 502, including one or more two-cavity optical stacks 704, can be designed to achieve such a multilayer optical structure 502.

Figure 8A:
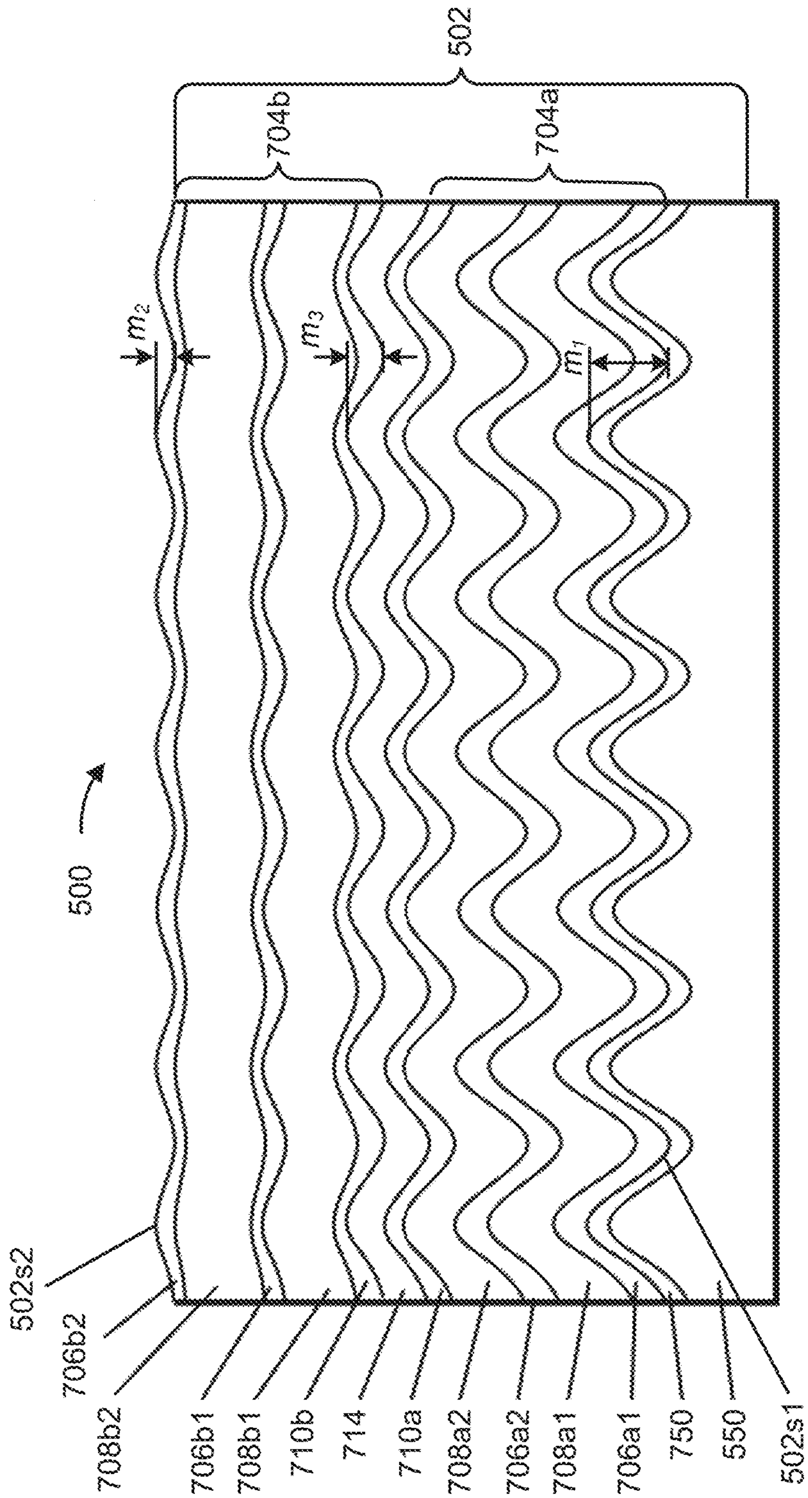
Figure 8C:
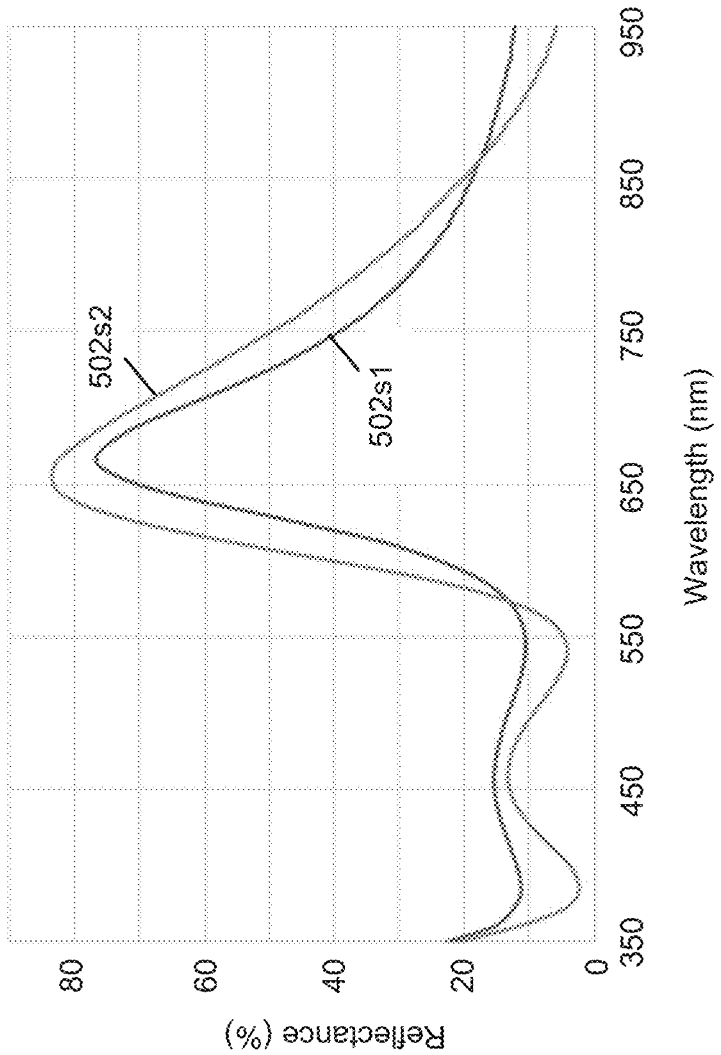

FIGS. 8A-8C are diagrams associated with another example implementation of a bifunctional pigment flake 500 comprising a multilayer optical structure 502 including a first optical stack 704*a* and a second optical stack 704*b*. In the example shown in FIG. 8A, the first optical stack 704*a* and the multilayer optical structure 502 are two-cavity optical stacks. In the example shown in FIG. 8A, the first optical stack 704*a* includes an absorber layer 706*a*1 (e.g., a first semi-transparent Cr layer), a transparent layer 708*a*1 (e.g., a first dielectric $MgF_2$ layer), an absorber layer 706*a*2 (e.g., a second semi-transparent Cr layer), a transparent layer 708*a*2 (e.g., a second dielectric $MgF_2$ layer) and a reflector layer 710*a* (e.g., a first opaque Al layer). Similarly, the second optical stack 704*b* includes a reflector layer 710*b* (e.g., a second opaque Al layer), a transparent layer 708*b*1 (e.g., a third dielectric MgF2 layer), an absorber layer 706*b*1 (e.g., a third semi-transparent Cr layer), a transparent layer 708*b*2 (e.g., a fourth dielectric MgF2 layer), an absorber layer 706*b*2 (e.g., a fourth semi-transparent Cr layer). As further shown, the multilayer optical structure 502 further includes an intermediate layer 712 (e.g., a fifth MgF2 layer) and a magnetizable layer 714 between the first optical stack 704*a* and the second optical stack 704*b*. Notably, in this example implementation, the multilayer optical structure 502 does not include the intermediate layer 712. Here, the thickness of the multilayer optical structure 502 is increased via the thickness of the two-cavity design (rather than through the use of an intermediate layer 712).

In some implementations, control of the thickness of the multilayer optical structure 502 may be provided by a thickness of one or more transparent layers 708. For example, by increasing an overall thickness of the multilayer optical structure 502, the thickness of one or more transparent layers 708 may serve to reduce the modulation $m_2$ of the second surface 502*s*2 (as compared to the modulation $m_1$ of the first surface 502*s*1). In some implementations, the thickness of such a transparent layer 708 can be in a range from approximately 50 nm to approximately 1500 nm. The multilayer optical structure 502 in the example shown in FIG. 8A can be expressed as follows:

Second optical stack 704*b*
Magnetizable layer 714
Intermediate layer 712
First optical stack 704*a* where first optical stack 704*a* comprises an absorber layer 706*a*1, a transparent layer 708*a*1, an absorber layer 706*a*2, a transparent layer 708*a*2, and a reflector layer 710*a*; and second optical stack 704*b* comprises a reflector layer 710*b*, a transparent layer 708*b*1, an absorber layer 706*b*1, a transparent layer 708*b*2, an absorber layer 706*b*2.

In a particular example implementation, the multilayer optical structure 502 may form a symmetric red-to-gold pigment with a pair of two-cavity optical stacks 704 having the optical design shown in FIG. 8B. In this example, the substrate 550 is coated with a release layer 750 in the form of water-soluble sodium chloride. The release layer 750 is then coated with the absorber layer 706*a*1, followed by the transparent layer 708*a*1, the absorber layer 706*a*2, the transparent layer 708*a*2, and the reflector layer 710*a*. As shown, these layers form a two-cavity first optical stack 704*a* of the multilayer optical structure 502. The magnetizable layer 714 (e.g., stainless steel or another suitable ferromagnetic material) is then deposited on the reflector layer 710*a*. Notably, the magnetizable layer 714 serves as the plane of the multilayer optical structure 502 in this example. The second optical stack 704*b* is then formed on the magnetizable layer 714 by forming the reflector layer 710*b*, the transparent layer 708*b*1, the absorber layer 706*b*1, the transparent layer 708*b*2, and the absorber layer 706*b*2. Example thicknesses of various layers are illustrated in the table shown in FIG. 8B, which provides a total thickness of the structure of approximately 1400 nm. Here, the modulation $m_1$ of the first surface 502*s*1 is 80 nm and the modulation $m_2$ of the second surface 502*s*2 is 34 nm. This difference in modulation of the surfaces of the multilayer optical structure 502 results in a difference in optical characteristics.

FIG. 8C is a diagram illustrating spectral characteristics of a first side of the multilayer optical structure 502 (e.g., a side of the multilayer optical structure 502 with the first surface 502*s*1) and a second side of the multilayer optical structure 502 (e.g., a side of the multilayer optical structure 502 with the second surface 502*s*2). Here, as noted above, the first surface 502*s*1 has a modulation $m_1$ of 80 nm and, due in part to the structure of the multilayer optical structure 502 (e.g., the thickness of the intermediate layer 712), the second surface 502*s*2 has a modulation $m_2$ of 34 nm.

As illustrated in FIG. 8C, the first side of the multilayer optical structure 502 (i.e., the side with the first surface 502*s*1 with the 80 nm modulation) has a generally lower reflectance than a reflectance of the second side of the multilayer optical structure 502 (e.g., the side with the second surface 502*s*2 with the 30 nm modulation) over a range of wavelengths from 350 nm to 950 nm. Further, a diffraction efficiency of the first side is different from a diffraction efficiency of the second side. Reflection and diffraction efficiencies of the first and second sides of this example multilayer optical structure 502 are summarized in the following table:

| | Modulation (nm) | Color (chroma C*) in L*a*b* color space | Reflectance (R, %) | Diffraction efficiency, (chroma C* units) |
|---|---|---|---|---|
| First surface 502s1 side | 80 | 38.2 | 77 | 24 |
| Second surface 502s2 side | 34 | 53.01 | 83 | 17 |

As illustrated in this example, chroma C* for the sample with 80 nm modulation at −80° observation angle is 24 units. For the sample with 36 nm modulation at the same observation angle, the chroma C* is 17 units. In other words, the first surface 502*s*1 side (e.g., the side with 80 nm modulation) reflects approximately 69% of incident light with a higher diffraction efficiency of 24 chroma units. In contrast, the second surface 502*s*2 side (e.g., the side with 34 nm modulation) reflects approximately 78% of light at lower diffraction efficiency of 17 units. The example experimental results in the table above show that lower reflectance and higher diffraction efficiency are provided at the first surface 502*s*1 side of the multilayer optical structure 502 with the higher modulation $m_1$ (e.g., the side adjacent to the substrate 550), while higher reflectance, lower diffraction efficiency, and brighter color are provided at the second surface 502*s*2 side of the multilayer optical structure 502 with the lower modulation $m_2$.

As indicated above, FIGS. 8A-8C are provided as examples. Other examples may differ from what is described with regard to FIGS. 8A-8C. The number and arrangement of layers shown in FIGS. 8A-8B are provided as an example. In practice, there may be additional layers, fewer layers, different layers, or differently arranged layers than those shown in FIGS. 8A-8B. Furthermore, two or more layers shown in FIGS. 8A-8B may be implemented within a single layer, or a single layer shown in FIGS. 8A-8B may be implemented as multiple, distributed layers. Additionally, or alternatively, a set of layers (e.g., one or more layers) shown in FIGS. 8A-8B may perform one or more functions described as being performed by another set of layers shown in FIGS. 8A-8B.

In some scenarios, a thickness of a two-cavity optical design may be insufficient to reduce the modulation $m_2$ of the second surface 502*s*2 of the multilayer optical structure 502. In such a scenario, both the thickness of the two-cavity design and an intermediate layer 712 can be used to provide a thickness that reduces the modulation $m_2$ of the second surface 502*s*2. FIG. 9 is a diagram illustrating an example of a gold bifunctional pigment flake 500 formed with this combination of techniques.

In this example, the substrate 550 is coated with a release layer 750, and the release layer 750 is then coated with the absorber layer 706*a*1, followed by the transparent layer 708*a*1, the absorber layer 706*a*2, the transparent layer 708*a*2, and the reflector layer 710*a*. As shown, these layers form a two-cavity first optical stack 704*a* of the multilayer optical structure 502. The magnetizable layer 714 (e.g., stainless steel or another suitable ferromagnetic material) is then deposited on the reflector layer 710*a*, and an intermediate layer 712 is formed on the magnetizable layer 714. Notably, the magnetizable layer 714 and the intermediate layer 712 serve as the plane of the multilayer optical structure 502 in this example. The second optical stack **704*b* is then formed on the magnetizable layer 714 by forming the reflector layer 710*b*, the transparent layer 708*b*1, the absorber layer 706*b*1, the transparent layer 708*b*2, and the absorber layer 706*b*2. Example thicknesses of various layers are illustrated in the table shown in FIG. 9, which provides a total thickness of the structure of 1866 nm. Here, the modulation $m_1$ of the first surface 502*s*1 is 80 nm and the modulation $m_2$ of the second surface 502*s*2 is 28 nm. This difference in modulation of the surfaces of the multilayer optical structure 502** results in a difference in optical characteristics.

As indicated above, FIG. 9 is provided as an example. Other examples may differ from what is described with regard to FIG. 9. The number and arrangement of layers shown in FIG. 9 are provided as an example. In practice, there may be additional layers, fewer layers, different layers, or differently arranged layers than those shown in FIG. 9. Furthermore, two or more layers shown in FIG. 9 may be implemented within a single layer, or a single layer shown in FIG. 9 may be implemented as multiple, distributed layers. Additionally, or alternatively, a set of layers (e.g., one or more layers) shown in FIG. 9 may perform one or more functions described as being performed by another set of layers shown in FIG. 9.

Figure 10:
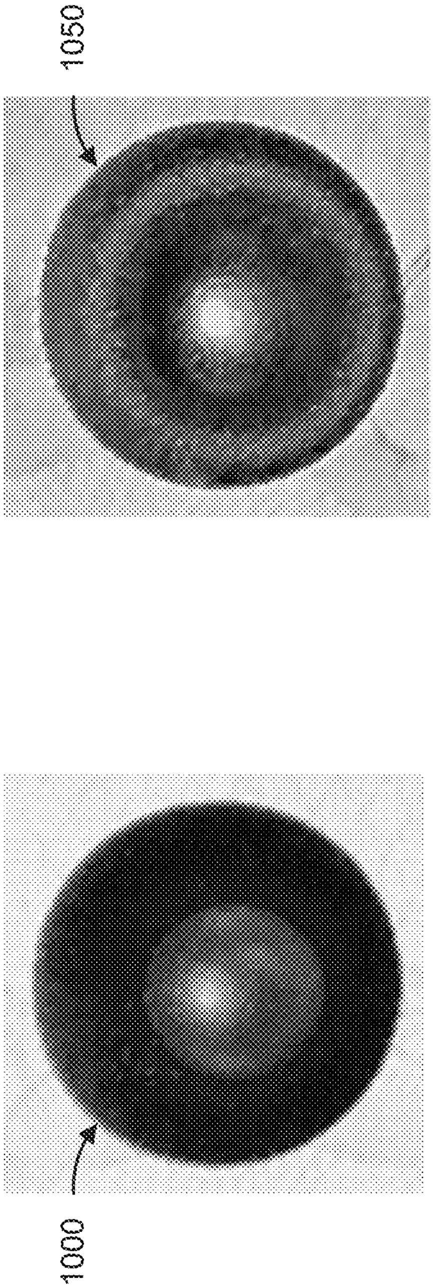
FIGS. 10-12 are diagrams illustrating examples of an optical security element that is printed using a pigment that comprises a plurality of bifunctional pigment flakes described herein.
Figure 11:
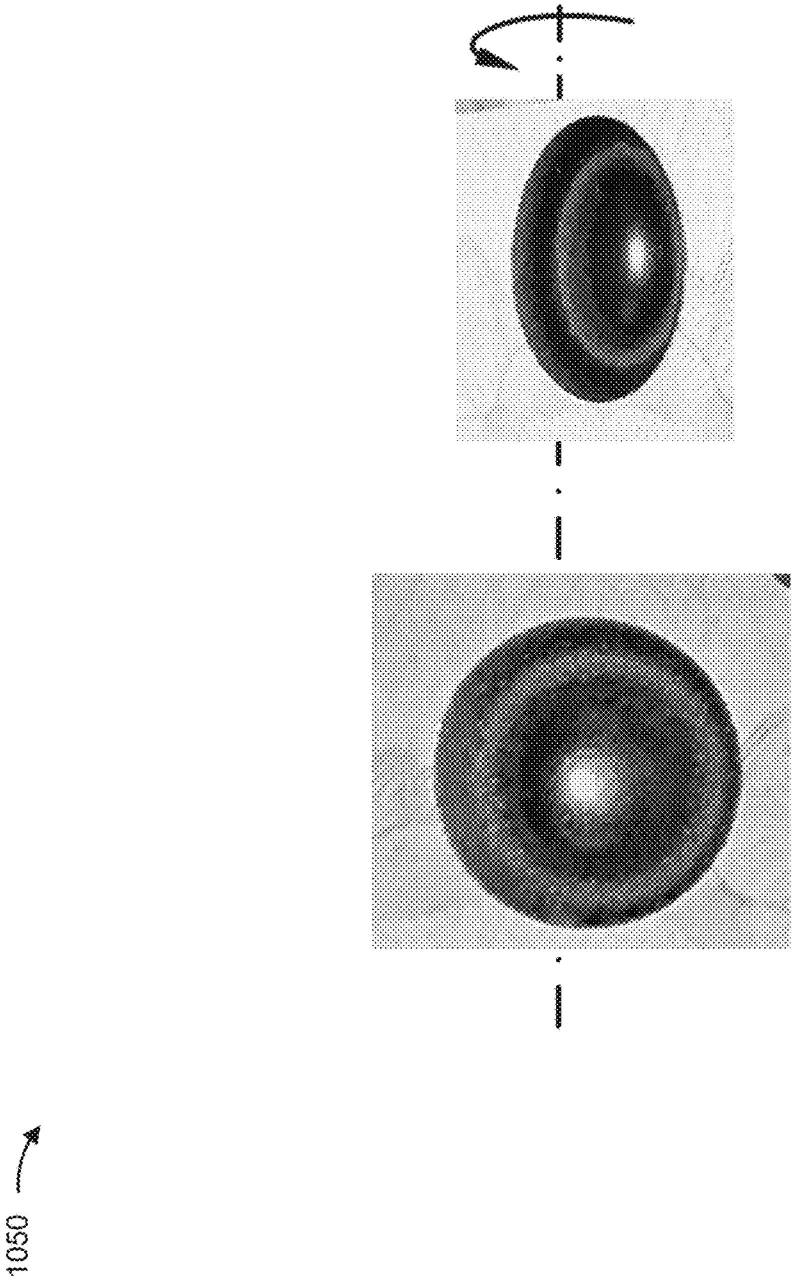
Figure 12:
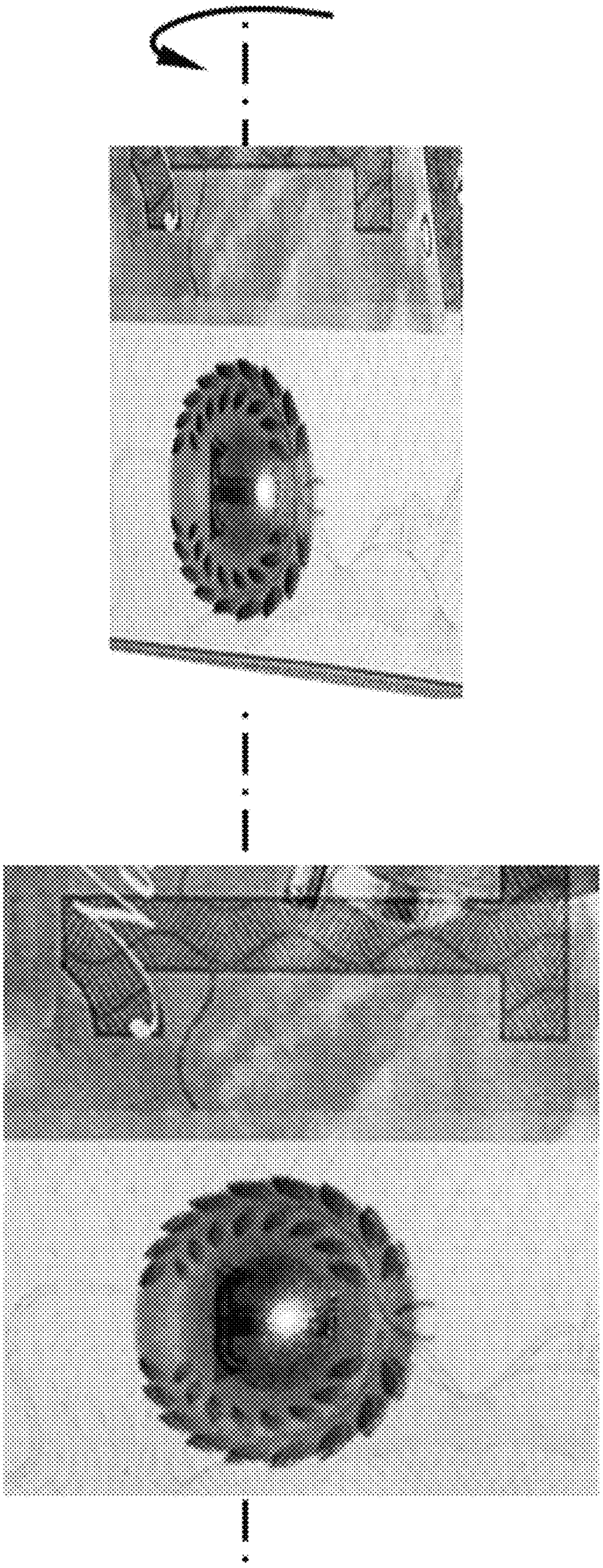

In some implementations, an optical security element can be printed using a pigment comprising a plurality of bifunctional pigment flakes 500. FIGS. 10-12 are diagrams illustrating examples of an optical security element 1050 that is printed using a pigment that comprises a plurality of bifunctional pigment flakes 500.

In some implementations, the optical security element 1050 is printed on a substrate (e.g., a paper substrate), and comprises a plurality of bifunctional pigment flakes 500 provided in a binder (e.g., an organic binder). Here, a given bifunctional pigment flake 500 comprises a first surface having a diffraction grating relief with a first modulation, and a second surface having a second modulation that is smaller than the first modulation, as described above. Further, in the optical security element 1050, the plurality of bifunctional pigment flakes 500 are arranged such that, in a presence of incident light, diffraction colors are exhibited by bifunctional pigment flakes 500 in a first region of the optical security element 1050, and an interference color is exhibited by bifunctional pigment flakes 500 in a second region of the optical security element 1050.

In some implementations, the optical security element 1050 may comprise, for example, an array of magnetically aligned bifunctional pigment flakes 500 that are arranged in a particular manner to form an optically illusive image. In some implementations, the plurality of bifunctional pigment flakes 500 are arranged to form a plurality of concentric rings within the binder, where the first region corresponds to a first subset of the plurality of concentric rings and the second region corresponds to a second subset of the plurality of concentric rings. Further, the plurality of bifunctional pigment flakes 500 may in some implementations be arranged to form a Fresnel-like structure within the binder, where the first region corresponds to a first section of the Fresnel-like structure and the second region corresponds to a second section of the Fresnel-like structure. In one example embodiment, a printed optical security element 1050 comprises a plurality of concentric rings of magnetically aligned bifunctional pigment flakes 500 that are disposed over a substrate and take the form of a Fresnel-like structure, such as a Fresnel reflector.

In FIG. 10, the left image is an image of a conventional optical security element 1000 that is printed with an ink that includes a conventional pigment, while the right image in FIG. 10 is an image of the optical security element 1050 printed with an ink that includes a pigment comprising a plurality of bifunctional pigment flakes 500 as described herein.

In the left image of FIG. 10, a dome-like hemispheric element is printed with a conventional magnetizable red-to-gold pigment. Here, the brighter (red) color near the center of the dome-like hemispheric element appears in a second region of the optical security element 1000, the second region being a center circular region in which conventional magnetizable pigment flakes are arranged with tilt angles with respect to the substrate in a range from 0° (at a center) to 45° (at an edge of the center circular region). The dark color appears in a first region of the optical security element 1000, the first region being a region in which conventional magnetizable pigment flakes are arranged with tilt angles with respect to the substrate in a range from 45° (at the edge of the center circular region) to 80° (at an outer edge of the optical security element 1000).

The optical security element 1050 shown in the right image of FIG. 10 is printed with ink including a pigment comprising a plurality of opaque bifunctional pigment flakes 500. Tilt angles of the bifunctional pigment flakes 500 in the first region and the second region are the same as those described above with respect to the left image in FIG. 10. That is, tilt angles of a subset of the bifunctional pigment flakes 500 in the second region with respect to the substrate are less than approximately 45°, while tilt angles of a subset of bifunctional pigment flakes 500 in the first region with respect to the substrate are greater than approximately 45°. As illustrated in the image of the optical security element 1050, in the second region of the optical security element 1050—the region in which the bifunctional pigment flakes 500 are arranged with tilt angles in a range from approximately 0° (at the center) to approximately 45° (at the edge of the center circular region)—the optical security element 1050 exhibits an interference color. As further shown, in the first region of the optical security element 1050—the region in which the bifunctional pigment flakes 500 are arranged with tilt angles in a range from approximately 45° (at the edge of the center circular region) to approximately 80° (at an outer edge of the optical security element 1050)—the optical security element 1050 exhibits diffraction of incident light, resulting in an appearance of a colored halo around the dome-like hemispheric element. That is, the optical security element 1050 exhibits diffraction colors in the first region and exhibits an interference color in the second region. The dome-like hemispheric element and the colored halo are dynamic features that move as the optical security element 1050 is tilted with respect to an observer. FIG. 11 demonstrates how these dynamic features of the optical security element 1050 move in response to a back-and-forth tilting of the optical security element 1050.

In some implementations, the optical security element 1050 can be printed with an ink including a pigment that includes a plurality of opaque bifunctional pigment flakes 500, as illustrated in FIGS. 10 and 11. In some implementations, the optical security element 1050 can be printed with an ink including a pigment that includes a plurality of transparent bifunctional pigment flakes 500 (rather than opaque bifunctional pigment flakes 500), an example of which is shown in FIG. 12. The appearance of such an optical security element 1050 at a normal observation angle and at a tilt angle are shown in the left and right images, respectively, of FIG. 12.

Notably, as illustrated in FIGS. 10-12, the optical security element 1050 provides visual separation of colors, regardless of tilt angle with respect to the observer. That is, the diffraction colors exhibited by the first region and the interference color exhibited by the second region are non-blended (i.e., do not blend together) in the optical security element 1050, regardless of tilt angle.

In some implementations, the optical security element 1050 can be printed in a single step (e.g., rather than requiring a multi-step process). That is, the optical security element 1050 comprising the plurality of bifunctional pigment flakes 500 that enable the optical security element 1050 to concurrently exhibit diffraction colors in a first region and an interference color in a second region can be fabricated in a single printing step. In this way, the optical security element 1050 can provide improved security (by concurrently exhibiting diffraction colors and an interference color) at a reduced fabrication cost and complexity.

Figure 13:
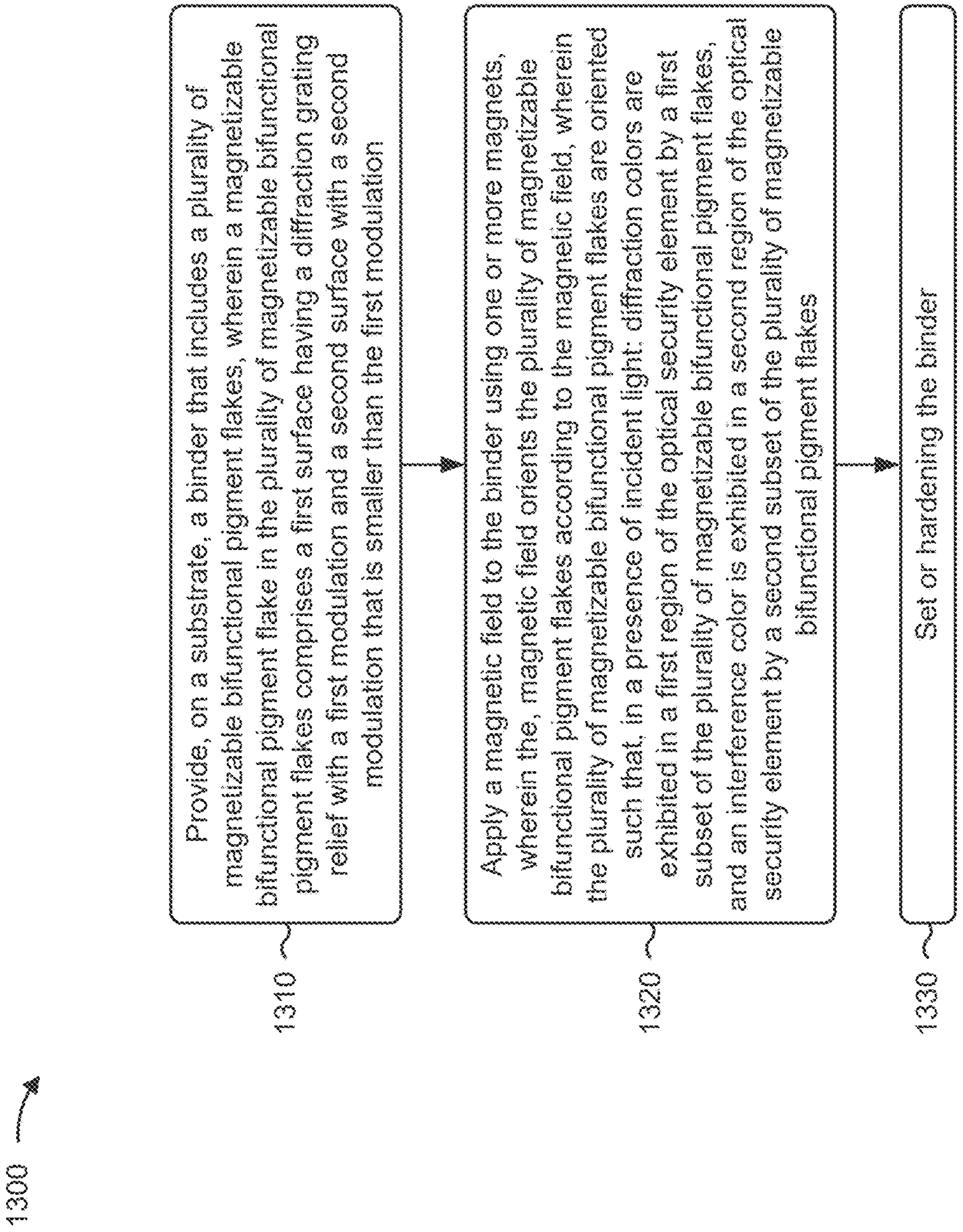
FIG. 13 is a flowchart of an example process associated with printing an optical security element including a pigment comprising a plurality of bifunctional pigment flakes on a substrate as described herein.

FIG. 13 is a flowchart of an example process 1300 associated with printing an optical security element including a pigment comprising a plurality of bifunctional pigment flakes on a substrate as described herein.

As shown in FIG. 13, process 1300 may include providing, on the substrate, a binder that includes a plurality of magnetizable bifunctional pigment flakes, wherein a magnetizable bifunctional pigment flake in the plurality of magnetizable bifunctional pigment flakes comprises a first surface having a diffraction grating relief with a first modulation and a second surface with a second modulation that is smaller than the first modulation (block 1310). For example, a binder that includes a plurality of magnetizable bifunctional pigment flakes 500 may be provided on the substrate, wherein a magnetizable bifunctional pigment flake in the plurality of magnetizable bifunctional pigment flakes comprises a first surface having a diffraction grating relief with a first modulation and a second surface with a second modulation that is smaller than the first modulation, as described above.

As further shown in FIG. 13, process 1300 may include applying a magnetic field to the binder using one or more magnets, wherein the magnetic field orients the plurality of magnetizable bifunctional pigment flakes according to the magnetic field, wherein the plurality of magnetizable bifunctional pigment flakes are oriented such that, in a presence of incident light diffraction colors are exhibited in a first region of the optical security element by a first subset of the plurality of magnetizable bifunctional pigment flakes, and an interference color is exhibited in a second region of the optical security element by a second subset of the plurality of magnetizable bifunctional pigment flakes (block 1320). For example, a magnetic field may be applied to the binder using one or more magnets, wherein the magnetic field orients the plurality of magnetizable bifunctional pigment flakes according to the magnetic field, wherein the plurality of magnetizable bifunctional pigment flakes are oriented such that, in a presence of incident light diffraction colors are exhibited in a first region of the optical security element by a first subset of the plurality of magnetizable bifunctional pigment flakes, and an interference color is exhibited in a second region of the optical security element by a second subset of the plurality of magnetizable bifunctional pigment flakes, as described above.

As further shown in FIG. 13, process 1300 may include setting or hardening the binder (block 1320). For example, the binder may be set or hardened so as to hold the plurality of bifunctional pigment flakes in the orientation as provided by the applied magnetic field.

Process 1300 may include additional implementations, such as any single implementation or any combination of implementations described below and/or in connection with one or more other processes described elsewhere herein.

In a first implementation, the first region is distinct from the second region such that the diffraction colors and the interference color are non-blended.

In a second implementation, alone or in combination with the first implementation, the magnetic field orients the plurality of magnetizable bifunctional pigment flakes such that tilt angles of the first subset of the plurality of magnetizable bifunctional pigment flakes in the first region with respect to the substrate are greater than approximately 45 degrees.

In a third implementation, alone or in combination with one or more of the first and second implementations, the magnetic field orients the plurality of magnetizable bifunctional pigment flakes such that tilt angles of the second subset of the plurality of magnetizable bifunctional pigment flakes in the second region with respect to the substrate are less than approximately 45 degrees.

In a fourth implementation, alone or in combination with one or more of the first through third implementations, the second modulation is at least 50% smaller than the first modulation.

In a fifth implementation, alone or in combination with one or more of the first through fourth implementations, the magnetic field orients the plurality of magnetizable bifunctional pigment flakes to form a plurality of concentric rings of magnetizable bifunctional pigment flakes within the binder.

In a sixth implementation, alone or in combination with one or more of the first through fifth implementations, the magnetic field orients the plurality of magnetizable bifunctional pigment flakes to form a Fresnel-like structure within the binder.

In a seventh implementation, alone or in combination with one or more of the first through sixth implementations, the plurality of bifunctional pigment flakes comprises a plurality of opaque bifunctional pigment flakes.

In an eighth implementation, alone or in combination with one or more of the first through seventh implementations, the plurality of bifunctional pigment flakes comprises a plurality of transparent bifunctional pigment flakes.

Although FIG. 13 shows example blocks of process 1300, in some implementations, process 1300 includes additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical security element printed on a substrate, the optical security element comprising:

- a plurality of bifunctional pigment flakes provided in a binder,
  - wherein a bifunctional pigment flake in the plurality of bifunctional pigment flakes comprises a first surface having a diffraction grating relief with a first modulation, and a second surface having a second modulation that is smaller than the first modulation,
  - wherein the plurality of bifunctional pigment flakes are arranged such that, in a presence of incident light:
    - a set of colors are exhibited by a first subset of the plurality of bifunctional pigment flakes that are in a first region of the optical security element, and
    - an additional color is exhibited by a second subset of the plurality of bifunctional pigment flakes that are in a second region of the optical security element.

2. The optical security element of claim 1, wherein the first region is distinct from the second region such that the set of colors and the additional color are non-blended.

3. The optical security element of claim 1, wherein tilt angles of bifunctional pigment flakes in the first subset of the plurality of bifunctional pigment flakes with respect to the substrate are greater than 45 degrees.

4. The optical security element of claim 1, wherein tilt angles of bifunctional pigment flakes in the second subset of the plurality of bifunctional pigment flakes with respect to the substrate are less than 45 degrees.

5. The optical security element of claim 1, wherein the second modulation is at least 50% smaller than the first modulation.

6. The optical security element of claim 1, wherein the plurality of bifunctional pigment flakes are arranged to form a plurality of concentric rings within the binder, wherein the first region corresponds to a first subset of the plurality of concentric rings and the second region corresponds to a second subset of the plurality of concentric rings.

7. The optical security element of claim 1, wherein the plurality of bifunctional pigment flakes are arranged to form a structure within the binder, wherein the first region corresponds to a first section of the structure and the second region corresponds to a second section of the structure.

8. The optical security element of claim 1, wherein the plurality of bifunctional pigment flakes comprises a plurality of opaque bifunctional pigment flakes.

9. The optical security element of claim 1, wherein the plurality of bifunctional pigment flakes comprises a plurality of transparent bifunctional pigment flakes.

10. A method for printing an optical security element on a substrate, comprising:

- providing, on the substrate, a binder that includes a plurality of magnetizable bifunctional pigment flakes, wherein a magnetizable bifunctional pigment flake in the plurality of magnetizable bifunctional pigment flakes comprises a first surface having a diffraction grating relief with a first modulation and a second surface with a second modulation that is smaller than the first modulation;
- applying a magnetic field to the binder using one or more magnets, wherein the magnetic field orients the plurality of magnetizable bifunctional pigment flakes according to the magnetic field, wherein the plurality of magnetizable bifunctional pigment flakes are oriented such that, in a presence of incident light:
  - a set of colors are exhibited in a first region of the optical security element by a first subset of the plurality of magnetizable bifunctional pigment flakes, and
  - a different color is exhibited in a second region of the optical security element by a second subset of the plurality of magnetizable bifunctional pigment flakes; and setting or hardening the binder.

11. The method of claim 10, wherein the first region is distinct from the second region such that the set of colors and the different color are non-blended.

12. The method of claim 10, wherein the magnetic field orients the plurality of magnetizable bifunctional pigment flakes such that tilt angles of the first subset of the plurality of magnetizable bifunctional pigment flakes in the first region with respect to the substrate are greater than 45 degrees.

13. The method of claim 10, wherein the magnetic field orients the plurality of magnetizable bifunctional pigment flakes such that tilt angles of the second subset of the plurality of magnetizable bifunctional pigment flakes in the second region with respect to the substrate are less than 45 degrees.

14. The method of claim 10, wherein the second modulation is at least 50% smaller than the first modulation.

15. The method of claim 10, wherein the magnetic field orients the plurality of magnetizable bifunctional pigment flakes to form a plurality of concentric rings of magnetizable bifunctional pigment flakes within the binder.

16. The method of claim 10, wherein the magnetic field orients the plurality of magnetizable bifunctional pigment flakes to form a structure within the binder.

17. A printed optical security element, comprising:

a first region comprising a first subset of a plurality of bifunctional pigment flakes disposed in a binder, wherein the first subset of the plurality of bifunctional pigment flakes are arranged such that, in a presence of incident light, a set of colors are exhibited in the first region of the printed optical security element, and a second region comprising a second subset of the plurality of bifunctional pigment flakes disposed in the binder, wherein the second subset of the plurality of bifunctional pigment flakes are arranged such that, in the presence of the incident light, another color is exhibited in the second region of the printed optical security element, wherein the first region is distinct from the second region such that the set of colors and the other color are non-blended.

18. The printed optical security element of claim 17, wherein a bifunctional pigment flake in the plurality of bifunctional pigment flakes comprises a first surface having a diffraction grating relief with a first modulation and a second surface having a second modulation that is smaller than the first modulation.

19. The printed optical security element of claim 17, wherein tilt angles of bifunctional pigment flakes in the first subset of the plurality of bifunctional pigment flakes with respect to a substrate of the printed optical security element are greater than 45 degrees.

20. The printed optical security element of claim 17, wherein tilt angles of bifunctional pigment flakes in the second subset of the plurality of bifunctional pigment flakes with respect to a substrate of the printed optical security element are less than 45 degrees.

* * * * *